United States Patent [19]
Rainville et al.

[11] Patent Number: 4,813,777
[45] Date of Patent: Mar. 21, 1989

[54] BI-FOCAL CORNEAL CONTACT LENS

[76] Inventors: Alain Rainville, 132 Hocquart Street, Sherbrooke, Canada, J1G 3B8; Bernard Beaulieu, 1387 Lincoln Street, Sherbrooke, Canada, J1H 2J2

[21] Appl. No.: 692,194

[22] Filed: Jan. 17, 1985

[30] Foreign Application Priority Data

Oct. 17, 1984 [CA] Canada .................................. 465629

[51] Int. Cl.[4] .............................................. G02C 7/04
[52] U.S. Cl. ...................................... 351/161; 351/177
[58] Field of Search ............... 351/160 R, 160 H, 161, 351/162

[56] References Cited

U.S. PATENT DOCUMENTS

| | | | |
|---|---|---|---|
| 3,279,878 | 10/1966 | Long | 351/161 |
| 3,472,581 | 10/1969 | Bronstein | 351/161 |
| 4,302,081 | 11/1981 | Tsuetaki | 351/161 |
| 4,324,461 | 4/1982 | Salvatori | 351/161 X |
| 4,618,229 | 10/1986 | Jacobstein et al. | 351/161 |

FOREIGN PATENT DOCUMENTS

| | | | |
|---|---|---|---|
| 721045 | 11/1965 | Canada | 351/161 |
| 955778 | 10/1974 | Canada | 351/161 |
| 2033101 | 5/1980 | United Kingdom | 351/161 |

OTHER PUBLICATIONS

Neefe Optical Lab brochure; "Condensed Fitting Recommendations for Geometric Segment Bifocal Contact Lenses"; Sep. 19, 1969.
Mandell; "A No-Jump Bifocal Contact Lens"; *Optometric Weekley*; vol. 58, No. 22; Jun. 1, 1967; pp. 19–21.
Ewell; "Bifocal Contact Lenses"; *Contacto*; vol. 5, No. 4; Apr. 1961; pp. 147, 148, 150, 151, 153.
Kontur Kontact Lens Co. advert.; *Contacto*; vol. 4, No. 10; Oct. 1960; pp. 472–473.

*Primary Examiner*—John K. Corbin
*Assistant Examiner*—Scott J. Sugarman

[57] ABSTRACT

A bi-focal corneal lens of uniform index of refraction, which is self-orienting, which is cut on a lathe with a lenticular attachment, so that the various curves can be cut in a minimum of passes. Mathematical equations are furnished to be fed to a computer, which calculates the parameters of the various curves in accordance with the data furnished by the optician so as to provide a lens with a maximal optical zone and a minimal thickness.

2 Claims, 2 Drawing Sheets

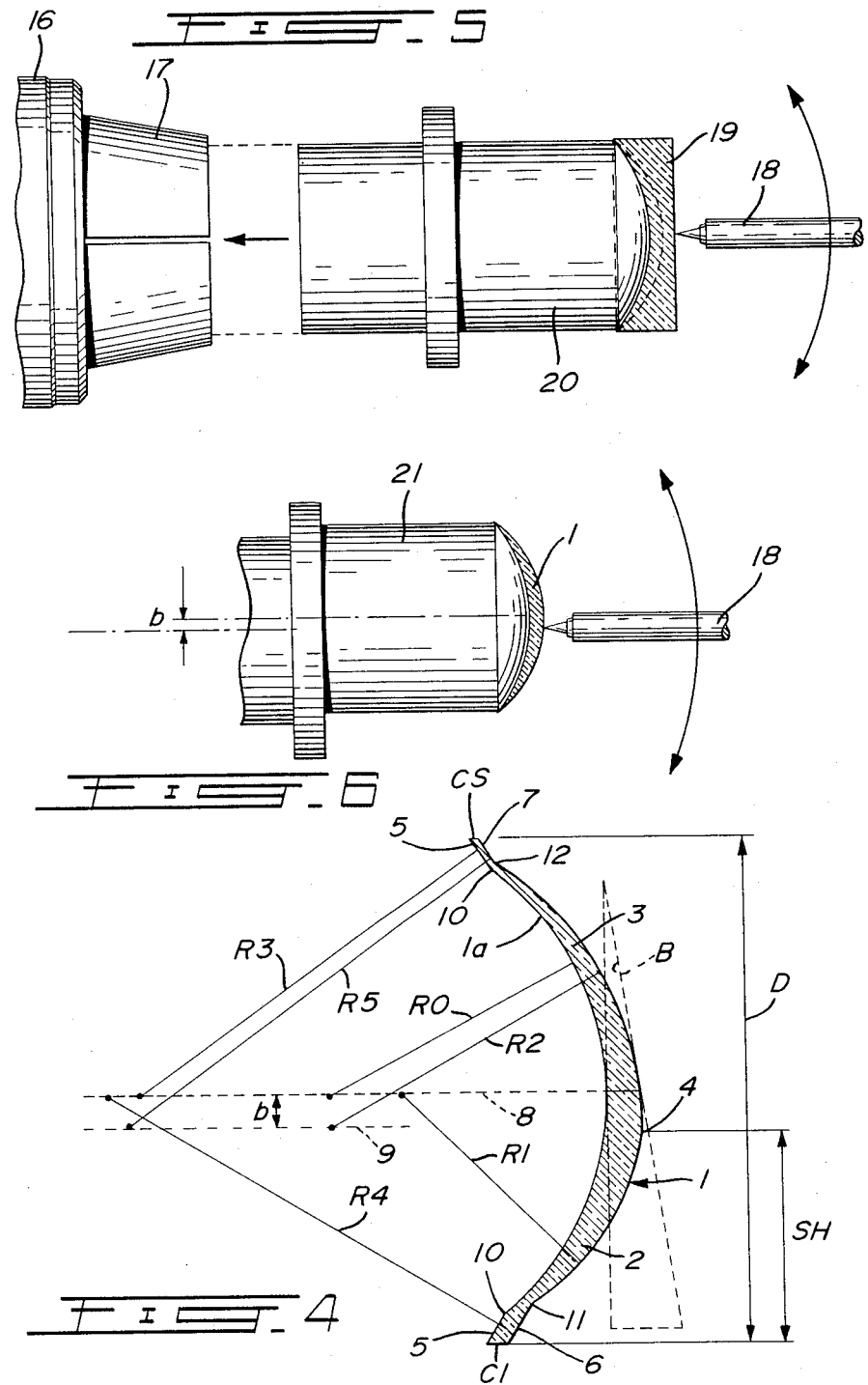

BI-FOCAL CORNEAL CONTACT LENS

FIELD OF THE INVENTION

The present invention relates to bi-focal corneal lenses of the type which has a lower near-vision segment and an upper distant-vision segment, which is self-orienting and which is made of a single material having uniform index of refraction.

BACKGROUND OF THE INVENTION

U.S. Pat. No. 3,279,879 to W. E. Long, dated Oct. 18, 1966, describes a bi-focal corneal lens of the above-described type, in which the lens is self oriented by providing the lower portion of the lens of greater weight than the upper portion, this being achieved by locating the center of curvature of the exterior distant-vision curve downwardly from the optical axis of the lens, so as to make the distant-vision segment thinner than the near-vision segment. However, the border edge of the lens of this Patent is tapered throughout, so that the lower lid has a tendency to overlap the lower border of the lens and the lens will not always be upwardly displaced with respect to the cornea for near vision. Furthermore, the lens in accordance with this Patent, together with already-known bi-focal corneal lenses already on the market, are of limited applications, because of their limited range of parameters.

OBJECTS OF THE INVENTION

It is therefore the general object of the present invention to provide a bi-focal corneal lens which can be made of any of the rigid, soft and gas-permeable materials normally used for making corneal lenses, which can be made with all the range of parameters as those found in conventional spectacle lenses; which provides a clear near-vision and clear distant-vision with a trouble-free passage from one optical zone to the other; in which there is no overlap of the lower lid over the lens; in which there is no jumping of the image; and which is very thin for maximum wearer's tolerance.

Another object of the invention is to provide a bi-focal corneal lens made by using a lathe with a lenticular attachment and by providing calculations for the various parameters of the lens designed to be handled by a computer.

SUMMARY OF THE INVENTION

The bi-focal corneal lens of the invention is of concavo-convex cross-section, with an interior curve to fit the cornea and with exterior near-vision and distant-vision curves to provide the respective near- and distant-vision powers, the near-vision segment being thicker than the distant-vision segment by locating the center of curvature of the near-vision curve along the optic center of the lens and by locating the center of curvature of the distant-vision segment below said optic center, this lens being provided with a border area of increased thickness, while permitting lens overlapping by the upper lid. The thick border area prevents warping of the lens and enables to form the upper and lower optical zones with a minimum thickness for added comfort to the wearer. The lens is cut on a lathe with a lenticular attachment, so that the lens can be manufactured with a minimum of passes of the cutting tool. Mathematical equations are provided to be fed to a computer, which can calculate the various desired parameters from an optician prescription so as to obtain a maximal optical zone and a minimal lens thickness.

BRIEF DESCRIPTION OF THE DRAWINGS

FIG. 4 is a vertical cross-section of the lens circular;

FIG. 5 is a partial view of the head stock and cutting tool of a lathe with the lens holder when cutting the external curves along the optic center of the lens; and FIG. 6 is a view of a second excentric holder for cutting the offset distant-vision and associated peripheral curves.

DETAILED DESCRIPTION OF THE DRAWINGS

Figure 3:
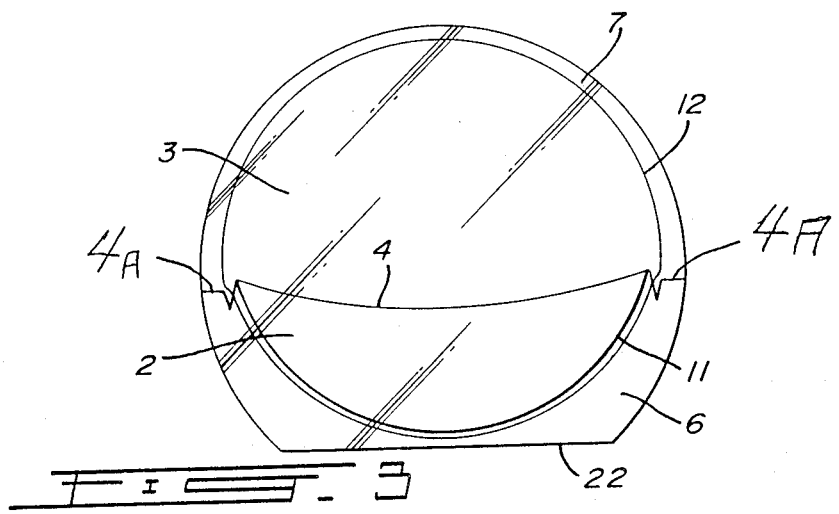
FIG. 3 is a front plan view of the lens.

The lens of the invention comprises a body 1 made of the rigid, soft or gas-permeable materials normally used for corneal lenses. The lens is concavo-convex and of initially circular shape. It has an interior concave surface 1a of spherical shape as defined by the interior curve or base curve of radius RO, said interior surface being adapted to fit the cornea of the wearer's eye. The body 1 has an exterior near-vision surface, also of partially spherical shape and as defined by the exterior near-vision curve of radius R1. This surface defines a lower near-vision segment 2, as shown in FIG. 3. The body 1 has a distant-vision surface defined by the exterior distant-vision curve of radius R2 and providing an upper distant-vision segment 3, the two segments 2 and 3 joining at a main junction line 4. The concave surface 1a is bordered all around the lens by a lenticular interior surface 5 defined by the peripheral interior curve of radius R3. The near-vision segment 2 is bordered by a lenticular exterior surface 6 having a peripheral exterior curve of radius R4. The distant-vision segment 3 is bordered by a lenticular exterior surface 7 defined by the peripheral exterior curve of radius R5. Lenticular surfaces 6 and 7 meet at junction lines 4a at both ends of main junction line 4. The center of curvatures of the curves defined by the radii RO, R1, R3, and R4 lie on the optical center axis 8 of the lens, said axis being that of the base curve of radius RO. The center of curvatures of curves of radii R2 and R5 are located on an axis 9, which is parallel to and is downwardly shifted from the optical axis 8 a vertical distance b.

Figure 1:
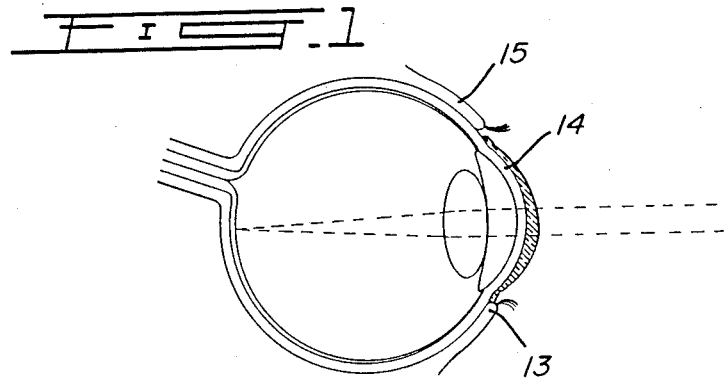
FIG. 1 is a vertical cross-section of the lens as fitted to a wearer's eye in the distant-vision position.
Figure 2:
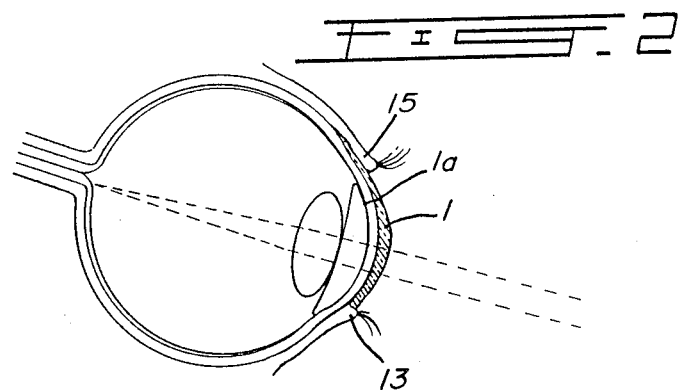
FIG. 2 is a view similar to that of FIG. 1 but with the lens in a near-vision position.

The interior concave surface 1a joins with lenticular interior surface 5 along a junction line 10 all around the lens, which defines a protuberant angle. The near-vision segment 2 joins with the lenticular exterior surface 6 along a junction line, indicated at 11, which defines a re-entrant angle. Similarly, the distant-vision segment 3 joins with the lenticular exterior surface 7 along a junction line 12 which defines another re-entrant angle. It follows that the lens maximum thickness can be made very small despite the radially-outwardly-convergent interior and exterior surfaces of the near-vision and distant-vision segments 2 and 3, because the thicker border edges impart rigidity to the lens. This provides for added tolerance to the user, such that a greater number of wearers will tolerate the bi-focal lens of the invention than conventional bi-focal contact lenses. The lower border thickness CI can be selected great enough so that this border will sit squarely on the wearer's lower lid 13 without overlapping by said lower lid;

therefore, the latter will always positively displace the lens upwardly with respect to the cornea 14 when passing from distant-vision to near-vision position, as shown in FIGS. 1 and 2. The upper border thickness CS can be selected thin enough to facilitate lens overlapping of the upper eye lid 15. If desired, C1 and CS can be made substantially equal to provide a lens with an edge of substantially uniform thickness all around the lens.

Because the center of curvature of radius R2 is downwardly shifted with respect to the optical center axis 8, the thickness of the near-vision segment 2 is greater than that of the distant-vision segment 3 and, therefore, the center of gravity of the lens is below the optical axis 8 and the lens is self-orienting.

The lens is cut on a lathe with a lenticular attachment, said lathe comprising a rotating head stock 16 with jaws 17 and provided with a tool holder, of known type and not shown, supporting a diamond tipped cutting tool 18. The tool holder is designed to make a double convex curve in one pass of the tool; a first curve of a given radius of curvature; and a second curve of greater or smaller radius of curvature. This is defined as a lenticular attachment.

A lens blank 19, of cylindrical shape and of a diameter equal to the total diameter D of the lens, is first cut with the interior curves of radii R0 and R3 and with conventional equipment.

Then the blank 19 is removably secured at the end of a cylindrical first holder 20 which is held by the jaws 17 of the head stock 16. The lens blank is rotated and the cutting tool 18 is made to accomplish first passes, so as to form first the near-vision curve of radius R1 and then the border curve of radius R4. The lens is removed and then removably fitted to the end of a second holder 21, the outer portion of which is excentric with respect to the inner jaw-engaging portion by a distance equal to distance b above noted. The distant-vision external curve R2 and then the peripheral external curve R5 are then accomplished by the cutting tool 18 in second passes.

The lens is then removed and can be truncated at its lower border portion to define a straight lower border edge, as shown at 22 in FIG. 3, to conform to the wearer's lower eye lid 13. For a number of lens users, it has been found that truncation is not required. The lens is then subjected to a conventional polishing operation which rounds off all its sharp edges.

The prescription for each client received from the optician contains the following information;
near-vision power P1
distant-vision power P2
radius of the base curve R0
total lens diameter D
segment height SH and material
this segment height being defined by the height of the junction line 4 above the lowermost point of the circular lens.

From this, the lens manufacturer calculates and/or selects the following parameters:
(a) the internal optical zone Zi expressed as the diameter of the circular junction line 10;
(b) the exterior optical zone Ze expressed as the diameter of the generally-circular junction lines 11, 12;
(c) the lower border thickness Ci;
(d) the upper border thickness CS;
(e) the theoretical central thickness Cc1 of the lens as obtained by the curve of radius R1;
(f) the final central lens thickness Cc2 as obtained by curve of radius R2; and
(g) the prism effect expressed by $\Delta$ From the optical geometry of lenses, it is known that R1 is a function of P1, R0, Cc, and n and that R2 is a function of P2, R0, Cc, and n,
wherein P1 and P2 are the powers for near vision and distant vision respectively; R0 is the base curve; Cc is the thickness of the lens at the junction line 4; and n is the refraction index of the lens material.

The values of R0, R1, and R2 are placed on an XY graph and R0 is fixed at $x=0$ and $y=0$, $b=0$ for R1, R3, and R4 and $b=a$ constant for R2 and R5. Then we have the following equations:

$$x^2 + y^2 = R0^2 \qquad 1.0$$

$$(x-a_1)^2 + y^2 = R1^2 \qquad 1.1$$

$$(x-a_2)^2 + (y-b)^2 = R2^2 \qquad 1.2$$

$$(x-a_3)^2 + y^2 = R3^2 \qquad 1.3$$

$$(x-a_4)^2 + y^2 = R4^2 \qquad 1.4$$

$$(y-a_5)^2 + (y-b)^2 = R5^2 \qquad 1.5$$

$\Delta$ has the following equation:
$$\Delta = 100(n-1) \tan B \qquad 1.6$$

where B is the top angle of the prism obtained from the tangent to the external curve at $y=0$ and from the perpendicular to the base curve R0 at the optic axis 8; tan B can be shown to be $$\tan B = \frac{b}{\sqrt{R1^2 - b^2}} \qquad 1.7$$

therefore;

$$\Delta = 100(n-1) \frac{b}{\sqrt{R1^2 - b^2}} \qquad 1.8$$

from which b is derived:

$$b = \frac{-R1}{\sqrt{\left(\frac{(n-1)100}{\Delta}\right)^2 + 1}} \qquad 1.9$$

$a_3$ is determined by the following equation:

$$a_3 = \sqrt{R3^2 - \frac{(Zi)^2}{2}} - \sqrt{R0^2 - \frac{(Zi)^2}{2}} \qquad 2.0$$

R1 is determined by the following equation:

$$R1 = \frac{(n-1)1000}{P1 + \frac{(n-1)1000}{R0}} + \frac{n-1}{n} Cc_1 \qquad 2.1$$

The angle $A_1^0$ for the near-vision optical zone is given by the following equation:

$$A_1^0 = \text{Arc sin} (Ze/2R1) \qquad 2.2$$

$a_4$ is given by the following equation:

$$a_4 = \frac{(y_2^2 - y_1^2 + x_2^2 - x_1^2)}{2(x_2 - x_1)} \qquad 2.3$$

R2 is given by the following equation:

$$R2 = \frac{(n-1)1000}{P1 + \frac{(n-1)1000}{R1}} + \frac{n-1}{n} C_{c_2} \qquad 2.4$$

The angle $A_2^0$ for the distant-vision optical zone is defined by the following equation:
$$A_2^0 = \text{Arc sin } (Ze/2R2) \qquad (2.5)$$

The value $a_5$ is defined by the following equation:

$$a_5 = \frac{(y_2^2 - y_1^2 + x_0^2 - x_1^2)}{2(x_2 - x_1)} \qquad 2.6$$

The value of b is given by equation 1.9; the thickness of the material to be removed during the second cutting, namely: along curve R2, is expressed as ETP, and ETP is given by the following equation:

$$ETP = R1 - \sqrt{R2^2 - b^2} \qquad 2.7$$

The above equations were developed by applicants, except equations 1.6, 2.1, and 2.4. These equations can be calculated by a computer from data obtained from each specific optician prescription and the computer provides the necessary data for the various adjustments of the tool holder of the lathe. This lathe can be numerically controlled.

In equation 2.3, $$x_1 = \sqrt{R3^2 - \frac{(D)^2}{2}} - a^3 + CI$$

$$y_1 = \frac{D}{2}$$

$$x_2 = \sqrt{R1^2 - \frac{(Ze)^2}{2}} + a_1$$

$$y_2 = \frac{Ze}{2}$$

In equation 2.6, on the other hand, $$x_1 = \sqrt{R3^2 - \left(\frac{D}{2}\right)^2} - a_3 + C_s$$

$$y_1 = \frac{D}{2} + B2$$

$$x_2 = \sqrt{R2^2 - \left(\frac{Ze}{2} + B2\right)^2} + A2$$

$$y_2 = \frac{Ze}{2} + b$$

What we claim is:

1. A bi-focal corneal lens comprising a body made of a single material having a uniform given index of refraction n, said lens having a given optical center axis and being concavo-convex, said body including a first central concave interior base surface of radius R0; a second peripheral concave interior surface surrounding said first surface and of radius R3; a third exterior convex near-vision segmental surface of radius R1; a fourth exterior peripheral convex lenticular surface solely surrounding said third surface and of radius R4; a fifth exterior upper distant-vision convex surface of radius R2; and a sixth peripheral exterior convex lenticular surface solely surrounding said fifth surface and of radius R5; said third and fifth surfaces defining the near-vision and distant-vision segments, respectively, joining along a transverse main junction line, said fourth and sixth surfaces joining along secondary junction lines at the ends of said main junction line, said first, second, third, and fourth surfaces having their center of curvature lying on said optical center axis, said fifth and sixth surfaces having their center of curvature lying on an axis parallel to said optical center axis and which is downwardly distant from the latter by a distance b, wherein R1 and R2 and their centers relative to that of R0 are selected to obtain the required near-vision and distant-vision dioptric powers, and wherein R3, R4, and R5 are greater than R2, whereby said first surface makes a protuberant angle at its junction with said second surface and said third and fifth surfaces make a re-entrant angle at their junction with said fourth and sixth surfaces, respectively.

2. A bifocal lens as defined in claim 1, wherein, assuming the radii of the curved surfaces are positioned on an XY graph with the X axis being the optical axis and $R_0$ fixed at $x=0$ and $y=0$, and assuming the values of $R_0$, $R_1$, $R_2$, $R_3$, and $R_4$ and $R_5$ are expressed by the following equations:

$$x^2 + y^2 = R_0^2$$

$$(x-a_1)^2 + y^2 = R_1^2$$

$$(x-a_2)^2 + (y-b)^2 = R_2^2$$

$$(x-a_3)^2 + y^2 = R_3^2$$

$$(x-a_4)^2 + y^2 = R_4^2$$

$$(y-a_5)^2 + (y-b)^2 = R_5^2$$

with b being determined by the following equation:

$$b = \frac{-R_1}{\sqrt{\left(\frac{(n-1)100}{\Delta}\right)^2 + 1}}$$

wherein $R_1$ and n are defined as above and $\Delta$ is the value of the prismatic effect;
wherein $a_1$ is defined by the following equation:

$$a_1 = R_0 + C_c - R_1$$

for $R_1 = \frac{(n-1)1000}{P1 + \frac{(n-1)1000}{R_0}} + \frac{n-1}{n} C_c$ and for $$C_c = \frac{[(P_1 + P_2) * 3 + 27] * 3 * 0.45}{[400 * 0.27]}$$

wherein $a_2$ is defined by the following equation:

$$a_2 = \sqrt{R_1^2 - H_s^2} + a_1 - \sqrt{R_0^2 - (H_s - b)^2}$$

where $$R_2 = \frac{(n-1)1000}{(P_1 + P_2) + \frac{(n-1)1000}{R_0}} + \frac{n-1}{n} C_c$$

where
$P_1$ and $P_2$ are the dioptric powers for the lens for the near vision and distant vision respectively of the lens; and where $H_s$ is the segment height of the lens being defined by the height of the junction line of the lower near-vision and upper distant vision segments of the lens, relative to the bottom edge of the lens;

wherein $a_3$ is determined by the following equation:

$$a_3 = \sqrt{R_3^2 - \left(\frac{Zi}{2}\right)^2} - \sqrt{R_0^2 - \left(\frac{Zi}{2}\right)^2}$$

for $R_1$ being determined by the following equation:

$$R_1 = \frac{(n-1)1000}{P_1 + \frac{(n-1)1000}{R_0}} + \frac{n-1}{n} CC_1$$

wherein $a_4$ is given by the following equation:

$$a_4 = \frac{(y_2^2 - y_1^2 + x_2^2 - x_1^2)}{2(x_2 - x_1)}$$

for $R_2$ being given by the following equation:

$$R_2 = \frac{(n-1)1000}{P_1 + \frac{(n-1)1000}{R_1}} + \frac{n-1}{n} CC_2$$

and wherein $a_5$ is determined by the following equation:

$$a_5 = \frac{(y_2^2 - y_1^2 + x_0^2 - x_1^2)}{2(x_2 - x_1)}$$

$$x_1 = \sqrt{R_3^2 - \left(\frac{D}{2}\right)^2} - a^3 + CI$$

$$y_1 = \frac{D}{2}$$

$$x_2 = \sqrt{R_1^2 - \left(\frac{Ze}{2}\right)^2} + a_1$$

$$y_2 = \frac{Ze}{2}$$

$$x_1 = \sqrt{R_3^2 - \left(\frac{D}{2}\right)^2} - a^3 + CS$$

$$y_1 = \frac{D}{2} + b$$

$$x_2 = \sqrt{R_2^2 - \left(\frac{Ze}{2} + b\right)^2} + A_2$$

$$y_2 = \frac{Ze}{2} + b$$

with D being the total lens diameter;
CI being the lower border thickness;
Ze being the exterior optical zone;
CS being the upper border thickness; and
Zi being the internal optical zone.

* * * * *